(12) United States Patent
Lambert et al.

(10) Patent No.: US 8,844,274 B2
(45) Date of Patent: Sep. 30, 2014

(54) COMPACT DIESEL ENGINE EXHAUST TREATMENT SYSTEM

(75) Inventors: Christine Kay Lambert, Dearborn, MI (US); Yinyan Huang, Northville, MI (US); Douglas A. Dobson, Ypsilanti, MI (US); Harendra S. Gandhi, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 607 days.

(21) Appl. No.: 12/351,174

(22) Filed: Jan. 9, 2009

(65) Prior Publication Data

US 2010/0175372 A1 Jul. 15, 2010

(51) Int. Cl.
*F01N 3/00* (2006.01)
*F01N 3/02* (2006.01)
*F01N 3/10* (2006.01)
*F01N 3/035* (2006.01)
*B01D 53/94* (2006.01)
*F01N 3/20* (2006.01)
*F01N 13/02* (2010.01)

(52) U.S. Cl.
CPC ...... *F01N 3/035* (2013.01); *B01D 2255/20738* (2013.01);
(Continued)

(58) Field of Classification Search
CPC ... F01N 2610/02; F01N 3/2066; F01N 3/021; F01N 3/035; F01N 3/0821; F01N 3/0842; F02D 41/029

USPC ........... 60/274, 286, 295, 297, 301, 303, 311; 422/169–172, 177, 182
See application file for complete search history.

(56) References Cited

U.S. PATENT DOCUMENTS 4,655,037 A * 4/1987 Rao ................................ 60/274
5,069,697 A 12/1991 Hamaguchi et al.
(Continued)

FOREIGN PATENT DOCUMENTS

WO 2006045315 A1 5/2006
WO 2007141638 A2 12/2007
WO 2008070551 A2 6/2008

OTHER PUBLICATIONS

Tennison et al, SAE Technical Paper Series 2004-01-1291, "NOx Control Development with Urea SCR on a Diesel Passenger Car", 2004 SAE World Congress, Detroit, Michigan, Mar. 8-11, 2004.

(Continued)

*Primary Examiner* — Thomas Denion
*Assistant Examiner* — Diem Tran
(74) *Attorney, Agent, or Firm* — Damian Porcari; Dinsmore & Shohl LLP

(57) ABSTRACT

A diesel engine exhaust treatment system and method is provided which utilizes a diesel particulate filter positioned in the exhaust gas stream of a vehicle which includes an SCR catalyst, an ammonia oxidation catalyst, and/or a diesel oxidation catalyst. The system is capable of performing multiple functions including converting $NO_x$ to $N_2$, converting HC and CO to $H_2O$ and $CO_2$, trapping particulates, and minimizing ammonia emissions. The system is more compact and efficient than prior systems utilizing separate catalyst units, and minimizes backpressure while maximizing catalyst performance.

17 Claims, 11 Drawing Sheets

(52) U.S. Cl.
CPC ........ *F01N 2510/06* (2013.01); B01D 53/9477 (2013.01); *F01N 2610/02* (2013.01); *B01D 2258/012* (2013.01); *B01D 2255/9025* (2013.01); *B01D 2255/9032* (2013.01); *B01D 2255/20761* (2013.01); *B01D 2255/9035* (2013.01); *B01D 2255/9205* (2013.01); *F01N 13/02* (2013.01); *B01D 2255/1021* (2013.01); *B01D 2255/1023* (2013.01); F01N 3/106 (2013.01); *B01D 2255/9155* (2013.01); *B01D 2251/2067* (2013.01); F01N 3/2066 (2013.01); *B01D 2251/2062* (2013.01); B01D 53/9472 (2013.01); *Y02T 10/24* (2013.01)
USPC ................... 60/297; 60/274; 60/286; 60/295; 60/301; 60/303; 60/311

(56) References Cited

U.S. PATENT DOCUMENTS

| | | | |
|---|---|---|---|
| 5,727,385 A | 3/1998 | Hepburn | |
| 5,964,088 A | 10/1999 | Kinugasa et al. | |
| 6,047,542 A | 4/2000 | Kinugasa et al. | |
| 6,109,024 A | 8/2000 | Kinugasa et al. | |
| 6,133,185 A | 10/2000 | Kinugasa et al. | |
| 6,467,257 B1 | 10/2002 | Khair et al. | |
| 6,641,785 B1 | 11/2003 | Neufert et al. | |
| 6,677,264 B1 | 1/2004 | Klein et al. | |
| 6,753,294 B1 * | 6/2004 | Brisley et al. | 502/439 |
| 6,928,806 B2 | 8/2005 | Tennison et al. | |
| 6,964,157 B2 | 11/2005 | Adelman et al. | |
| 7,062,904 B1 * | 6/2006 | Hu et al. | 60/286 |
| 7,094,728 B2 | 8/2006 | Yan et al. | |
| 7,097,817 B2 | 8/2006 | Brisley et al. | |
| 7,117,667 B2 | 10/2006 | Mital et al. | |
| 7,119,044 B2 | 10/2006 | Wei et al. | |
| 7,150,145 B2 | 12/2006 | Patchett et al. | |
| 7,178,331 B2 | 2/2007 | Blakeman et al. | |
| 7,181,906 B2 | 2/2007 | Dalla Betta et al. | |
| 7,188,469 B2 | 3/2007 | Bonadies et al. | |
| 7,189,375 B2 | 3/2007 | Molinier et al. | |
| 7,213,395 B2 | 5/2007 | Hu et al. | |
| 7,225,613 B2 | 6/2007 | Hammerle et al. | |
| 7,229,597 B2 * | 6/2007 | Patchett et al. | 422/177 |
| 7,257,941 B1 | 8/2007 | Reuter | |
| 7,264,785 B2 | 9/2007 | Blakeman et al. | |
| 7,332,135 B2 | 2/2008 | Gandhi et al. | |
| 7,371,353 B2 | 5/2008 | Robel et al. | |
| 7,490,464 B2 * | 2/2009 | Li et al. | 60/295 |
| 7,716,921 B2 * | 5/2010 | Cheng | 60/295 |
| 7,856,809 B2 * | 12/2010 | During | 60/295 |
| 7,902,107 B2 * | 3/2011 | Patchett et al. | 502/74 |
| 8,011,177 B2 * | 9/2011 | Cheng | 60/286 |
| 2004/0037754 A1 | 2/2004 | van Setten et al. | |
| 2004/0076565 A1 | 4/2004 | Gandhi et al. | |
| 2005/0031514 A1 | 2/2005 | Patchett et al. | |
| 2005/0232830 A1 | 10/2005 | Bruck | |
| 2006/0010859 A1 | 1/2006 | Yan et al. | |
| 2006/0039843 A1 * | 2/2006 | Patchett et al. | 423/239.1 |
| 2006/0100098 A1 | 5/2006 | Ura et al. | |
| 2006/0179825 A1 | 8/2006 | Hu et al. | |
| 2006/0242947 A1 | 11/2006 | Kay et al. | |
| 2006/0251548 A1 | 11/2006 | Willey et al. | |
| 2006/0254258 A1 | 11/2006 | Blakeman et al. | |
| 2007/0012032 A1 | 1/2007 | Hu | |
| 2007/0056268 A1 | 3/2007 | McCarthy | |
| 2007/0079605 A1 | 4/2007 | Hu et al. | |
| 2007/0128088 A1 | 6/2007 | Willey et al. | |
| 2007/0137184 A1 * | 6/2007 | Patchett et al. | 60/286 |
| 2007/0144153 A1 | 6/2007 | Gandhi et al. | |
| 2007/0144156 A1 | 6/2007 | Gandhi et al. | |
| 2007/0157608 A1 | 7/2007 | Gandhi et al. | |
| 2007/0196246 A1 | 8/2007 | Yano | |
| 2007/0224093 A1 | 9/2007 | Miyairi et al. | |
| 2007/0238605 A1 | 10/2007 | Strehlau et al. | |
| 2007/0240402 A1 | 10/2007 | Andreasson et al. | |
| 2007/0283681 A1 | 12/2007 | Makkee et al. | |
| 2008/0006025 A1 | 1/2008 | McCarthy | |
| 2008/0127634 A1 | 6/2008 | Cho et al. | |
| 2008/0141661 A1 * | 6/2008 | Voss et al. | 60/295 |
| 2008/0202107 A1 * | 8/2008 | Boorse et al. | 60/301 |
| 2008/0282670 A1 | 11/2008 | McCarthy, Jr. et al. | |
| 2008/0292519 A1 | 11/2008 | Caudle et al. | |
| 2008/0314031 A1 | 12/2008 | Shamis et al. | |

OTHER PUBLICATIONS

Orlando et al., "The reactions of NO2 and CH3CHO with Na—Y zeolite and the relevance to plasma-activated lean NOx catalysis", Science Direct, Catalysis Today 89 (2004) 151-157.

Tennison et al., "NOx Control Development With Urea SCR on a Diesel Passenger Car", SAE International, 2004 SAE World Congress, Detroit, Michigan, Mar. 8-11, 2004.

Thomas Screen, "Platinum Group Metal Perovskite Catalysts", Apr. 2007; Platinum Metals Review, vol. 51 Issue 2, pp. 87-92, UK.

Timothy V. Johnson, "Diesel Emission Control in Review", 2009; SAE Int. J. Fuels Lubr, vol. 2 Issue 1, pp. 1-12.

Mark Jagner, et al., "Detection, Origin, and Effect of Ultra-Low Platinum Contamination on Diesel-SCR Catalysts", Oct. 6, 2008; SAE International Virtual Conference Center, p. 1.

D. Fino, et al., "Diesel Particulate Abatement via Wall-Flow Traps Based on Perovskite Catalysts", Sep.-Oct. 2003; PubMed, U.S. National Library of Medicine, National Institutes of Health; p. 1.

Office Action pertaining to U.S. Appl. No. 12/200,100 dated Dec. 7, 2010.

Office Action pertaining to U.S. Appl. No. 12/425,986 dated May 14, 2010.

Office Action pertaining to U.S. Appl. No. 12/425,986 dated Oct. 26, 2010.

\* cited by examiner

COMPACT DIESEL ENGINE EXHAUST TREATMENT SYSTEM

BACKGROUND OF THE INVENTION

The present invention relates to a compact diesel engine exhaust treatment system, and more particularly, to an exhaust treatment system which utilizes a diesel particulate filter including integrated selective reduction and ammonia oxidation catalysts thereon such that it is capable of performing multiple catalytic functions.

In recent years, environmental regulations in the United States and Europe restricting diesel particulate emissions have necessitated improvements in the removal of particulates from diesel engine emissions. Diesel engine exhaust contains gaseous emissions such as carbon monoxide (CO), unburned hydrocarbons (HC), and nitrogen oxides ($NO_x$), as well as particulate matter. Such particulates generally consist of carbonaceous particulates in the form of soot.

Common methods used to convert these exhaust components to harmless components include the use of a diesel oxidation catalyst (DOC), a selective catalytic reduction catalyst (SCR), and a diesel particulate filter (DPF).

Diesel oxidation catalysts are placed in the exhaust gas stream of a diesel engine and typically contain platinum group metals (PGM), base metals, or a combination thereof. These catalysts promote the conversion of CO and HC emissions to carbon dioxide and water.

Selective catalytic reduction catalysts (SCR) are used to convert $NO_x$ to $N_2$ and typically comprise a base metal and utilize an ammonia reductant, typically in the form of aqueous urea, which is injected in the exhaust stream downstream from the diesel oxidation catalyst. After water vaporization and urea hydrolysis, the formed ammonia reacts with $NO_x$ in the exhaust gas stream on the SCR catalyst to form $N_2$.

A diesel particulate filter (DPF) collects soot or particulate matter from engine exhaust. Accumulated particulates are then combusted at elevated temperatures to regenerate the filter.

A typical diesel engine exhaust treatment system for light and heavy duty applications may include the use of a diesel oxidation catalyst (DOC), selective catalytic reduction catalyst (SCR), and diesel particulate filter (DPF) in the form of three separate units, each positioned downstream from the other in the exhaust stream.

While such a system is efficient for meeting current emission regulations, it suffers from a number of drawbacks. For example, in some vehicle applications, the available space for packaging is limited. The use of three separate units results in a large system which produces a high exhaust counter-pressure (backpressure) as the exhaust flows through each unit. In addition, the use of large sized diesel particulate filters including a PGM coating makes the system expensive to produce due to the high cost of platinum group metals.

Further, in exhaust treatment systems which utilize a reductant delivery system for the elimination of $NO_x$, such systems often further include the use of a separate ammonia oxidation catalyst, or ammonia slip catalyst, to control ammonia emissions resulting from excess ammonia used in the conversion of $NO_x$. Such a catalyst is typically positioned downstream from the diesel particulate filter.

It would be desirable to develop an exhaust treatment system which is efficient but which is smaller in size. One such system is described in U.S. Patent Application 2005/0031514, which describes a diesel exhaust treatment system including a diesel oxidation catalyst positioned upstream from a diesel particulate filter including a selective catalytic reduction catalyst thereon, such that the diesel particulate filter performs two catalytic functions, i.e., removal of particulates from the exhaust stream and conversion of $NO_x$ to $N_2$. However, the system further includes a separate SCR catalyst or slip oxidation catalyst unit downstream from the filter, which may generate additional exhaust gas back pressure to the gas flow.

Another catalyst system is described in U.S. Pat. No. 7,119,044, in which a diesel particulate filter includes multiple catalysts coated on different surfaces of the filter walls to perform multiple functions, e.g., catalytic oxidation, and lean $NO_x$ function. However, because the coatings are only on the filter surface, such a system may still encounter high backpressure, which results in lower catalyst performance.

Accordingly, there is still a need in the art for a diesel engine exhaust system which is compact, which efficiently achieves conversion of components and removal of particulates in the exhaust gas in an efficient and cost-effective manner, and which minimizes backpressure.

SUMMARY OF THE INVENTION

Embodiments of the invention meet those needs by providing a compact diesel engine exhaust treatment system which utilizes a diesel particulate filter including an SCR catalyst coating thereon which permeates the filter walls, an ammonia oxidation catalyst coated at the filter outlet channels, and a diesel oxidation catalyst which is either positioned upstream from the filter or which is coated at the filter outlet channels. Thus, the catalyst-coated diesel particulate filter performs multiple functions as it filters particulate matter from the diesel engine, provides reduction of $NO_x$, removes ammonia slip, and in embodiments where the filter includes a diesel oxidation catalyst, removes HC and CO.

The exhaust treatment system is compact in size as it permits the use of either a single catalyst brick or only two catalyst bricks, is lower in cost than previous systems, and minimizes backpressure while maximizing catalyst utilization.

According to one aspect of the invention, a diesel exhaust gas treatment system is provided which comprises a diesel particulate filter positioned in an exhaust stream, where the diesel particulate filter includes an inlet, an outlet, and a plurality of porous walls; wherein the filter includes an SCR catalyst and an ammonia oxidation catalyst coated thereon; and a diesel oxidation catalyst positioned upstream from the diesel particulate filter or coated on the diesel particulate filter. By "thereon" or "on," we mean that the catalyst 1) is coated on the filter such that it is positioned on the surface of the walls, inlet or outlet, 2) is coated on the porous walls such that it permeates the filter, i.e., it is positioned within the filter; or 3) is coated so that it is both within the porous filter walls and on the surface of the walls. In one embodiment, the SCR catalyst is within the walls of the filter.

In one embodiment, the treatment system further includes a reductant delivery system upstream from the diesel particulate filter which is adapted to provide a source of ammonia or urea to the exhaust stream.

In one embodiment, the treatment system comprises one brick, and the diesel particulate filter includes the SCR catalyst; the ammonia oxidation catalyst, and the diesel oxidation catalyst. In one embodiment, the diesel oxidation catalyst and ammonia oxidation catalyst are coated at the outlet of the filter.

In an alternative embodiment, the treatment system comprises first and second bricks, where the first brick comprises the diesel oxidation catalyst and the second brick comprises the diesel particulate filter including the SCR catalyst and the ammonia oxidation catalyst. In one embodiment, the ammonia oxidation catalyst is coated at the outlet of the filter.

In one embodiment, the SCR catalyst comprises zeolite and a base metal selected from copper and iron. The ammonia oxidation catalyst comprises platinum, palladium, or a combination thereof. The diesel oxidation catalyst comprises platinum, palladium, or a combination thereof.

In one embodiment, the diesel particulate filter has a porosity of from about 50 to 65%, which ensures permeation of the SCR catalyst coating into the filter walls.

In another embodiment, a diesel exhaust gas treatment system is provided comprising a diesel particulate filter positioned in an exhaust stream including an inlet, an outlet, and a plurality of porous walls. The filter includes an SCR catalyst and an ammonia oxidation catalyst coated thereon; and a diesel oxidation catalyst positioned upstream from the diesel particulate filter and coated on the diesel particulate filter.

In another embodiment of the invention, a diesel exhaust gas treatment system is provided which comprises a diesel particulate filter positioned in an exhaust stream which includes an inlet, an outlet, and a plurality of porous walls; where the filter includes an SCR catalyst within the filter walls, a diesel oxidation catalyst coated on at least a portion of the filter, and a reductant delivery system upstream from the diesel particulate filter which is adapted to provide a source of ammonia or urea to the exhaust stream. In this embodiment, the diesel particulate filter is capable of capturing particulates, reducing $NO_x$, converting HC and CO, and reducing ammonia slip. In this embodiment, the system may further include an ammonia oxidation catalyst on at least a portion of the filter.

In a method of treating diesel engine exhaust gases produced in an exhaust stream, exhaust gases are passed through the exhaust gas treatment system which includes a diesel particulate filter including an SCR catalyst and ammonia oxidation catalyst coated thereon, and a diesel oxidation catalyst positioned upstream from the diesel particulate filter or coated on the diesel particulate filter. In one embodiment, the treatment system further includes a reductant delivery system upstream from the diesel particulate filter which is adapted to provide a reductant source comprising ammonia or urea compounds to the exhaust stream. The reductant delivery system comprises an injector for injecting a vaporized mixture of reductant and water in metered portions into the exhaust gas stream.

As the exhaust gases pass through the system, particulate matter from the exhaust gases is trapped on the filter, a substantial portion of $NO_x$ in the exhaust stream is converted to $N_2$; a substantial portion of CO and HC in the exhaust stream are converted to $CO_2$ and $H_2O$; and ammonia emissions are converted to nitrogen.

In one embodiment, the diesel oxidation catalyst is positioned upstream from the reductant delivery system such that conversion of HC and CO occurs upstream from the filter. In another embodiment, the diesel particulate filter includes the SCR catalyst, ammonia oxidation catalyst, and diesel oxidation catalyst such that $NO_x$ conversion and particulate matter trapping occur at the inlet of the filter, and HC, CO, and ammonia emissions are converted at the outlet of the filter.

Accordingly, it is a feature of the present invention to provide a diesel engine exhaust treatment system and method which is compact and efficient in removing undesirable components and particulates from the exhaust gas stream with minimal backpressure. Other features and advantages of the invention will be apparent from the following description, the accompanying drawings, and the appended claims.

DETAILED DESCRIPTION OF THE PREFERRED EMBODIMENTS

We have found that the use of an exhaust treatment system which utilizes only one or two catalyst bricks results in efficient reduction of exhaust components, reduces backpressure in the system, and permits a more compact unit which is less expensive to produce. In addition, by coating the SCR catalyst such it permeates the filter walls and coating the ammonia oxidation catalyst and/or diesel oxidation catalyst at the outlet of the filter, backpressure is minimized and catalyst utilization is maximized.

Figure 1:
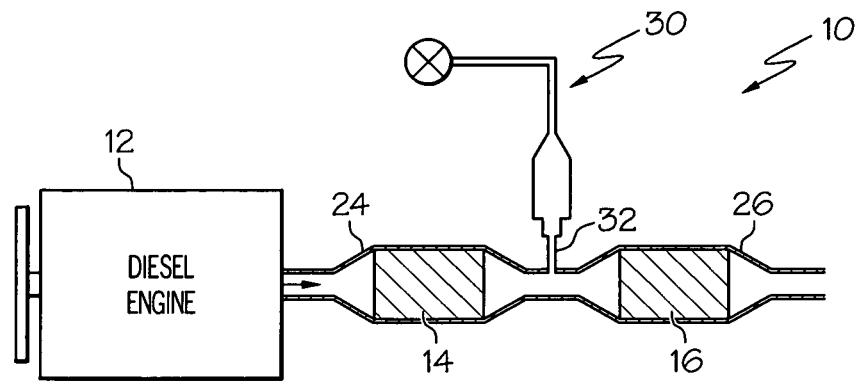
FIG. 1 is a schematic illustration of a diesel engine exhaust treatment system in accordance with an embodiment of the invention.

Referring now to FIG. 1, one embodiment of the diesel exhaust treatment system 10 is illustrated which comprises a two brick system. The exhaust treatment system is coupled to an exhaust manifold 12 of a diesel engine and includes a diesel oxidation catalyst 14 which is positioned upstream from a diesel particulate filter 16. The diesel oxidation catalyst 14 and diesel particulate filter 16 are each contained within a housing or canister 24, 26 which comprise first and second bricks.

In this embodiment, the diesel oxidation catalyst 14 is coated on a refractory inorganic oxide or ceramic honeycomb substrate as a washcoat at about 45 to about 300 $g/ft^3$ and utilizes a catalyst material selected from platinum, palladium, or a combination thereof. The washcoat may further comprise a binder such as alumina, silica, titania, or zirconia.

Figure 1A:
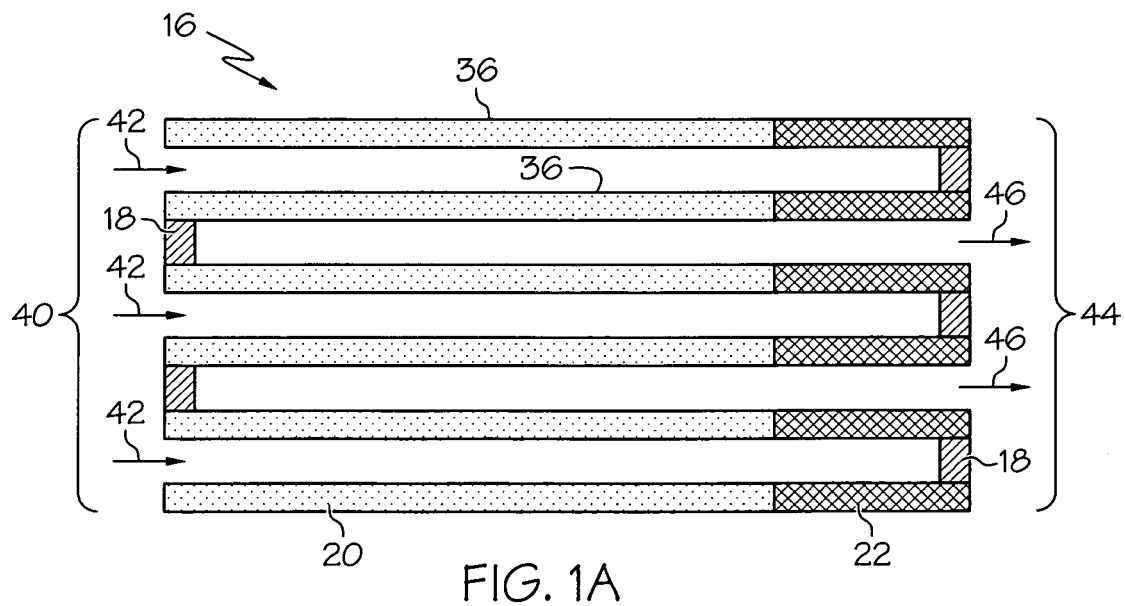
FIG. 1A is a schematic illustration showing an enlarged view of the diesel particulate filter of FIG. 1 including SCR and ammonia oxidation catalysts catalysts thereon.

The diesel particulate filter 16 includes an SCR catalyst 20 and an ammonia oxidation catalyst (AMOX) 22 as shown in more detail in FIG. 1A. The diesel oxidation catalyst 14 and diesel particulate filter 16 are each contained within a housing or canister 24, 26.

As shown in FIG. 1, the treatment system further includes a reductant delivery system 30, which is coupled to the exhaust manifold upstream of the diesel particulate filter 16. A reductant, such as ammonia, aqueous urea or other ammonia-generating compounds is stored in a storage vessel (not shown) and delivered to the reductant delivery system in metered amounts. The reductant delivery system includes an injector 32 for injecting the reductant into the exhaust stream at the appropriate time.

Referring now to FIG. 1A, an enlarged view of the diesel particulate filter 16 of FIG. 1 is shown. The diesel particulate filter is a wall flow filter comprising a highly porous filter substrate having a porosity of from about 50 to 65%. The size of the pores preferably range from about 15 to about 22 nm, but it should be appreciated that the distribution of pore sizes may vary throughout the filter substrate.

Suitable filter substrates include refractory inorganic oxides or ceramics, such as cordierite, mullite, silicon carbide, alpha-alumina, silica, alkali, and alkaline earth zirconium phosphates (NZP). As can be seen, the filter comprises a plurality of parallel channels separated by thin porous walls 36. The filter includes an inlet 40 comprising inlet channels 42 and an outlet 44 comprising outlet channels 46. The channels are open at one end and plugged at the opposite end with plugs 18 such that when particle laden exhaust gas flows through the walls, gas is able to escape through the pores in the wall material, but particulates are trapped.

In the embodiment shown, the filter 16 includes an SCR catalyst 20 which has been coated so that it permeates the filter walls and is completely within the walls of the filter. Generally, the SCR washcoat is applied over the entire substrate in the form of a slurry such that the slurry is drawn into the substrate through capillary action. Alternatively, a vacuum may be applied to draw the slurry into the wall. The particle size of the washcoat materials are preferably selected so as to fit into the pores without blocking them.

Because the catalyst permeates the walls of the filter, this allows for greater contact time with the exhaust gas and thus higher $NO_x$ conversion. For example, the SCR washcoat may be drawn in from the inlet and outlet channels so that it permeates the walls completely. The washcoat may also be coated so that a small overlayer coating is provided at the inlet and/or outlet of the filter as long as it generates minimal backpressure. The SCR catalyst washcoat is coated at about 0.5 to about 2.5 $g/in.^3$ and may comprise a copper, zeolite, or vanadia catalyst material and the remainder may comprise a binder, and a support material such as alumina, silica, titania, or zirconia.

Referring again to FIG. 1A, the ammonia oxidation catalyst 22 is coated at the outlet of the filter using a washcoat suspension. By coating the ammonia oxidation catalyst at the outlet, ammonia is prevented from being oxidized before it can be used for $NO_x$ reduction. The ammonia oxidation catalyst also aids in controlling hydrocarbon and carbon monoxide slip. Further, the incorporation of the ammonia oxidation catalyst at the filter outlet eliminates the need for a separate ammonia oxidation catalyst downstream, enabling the system to be used in smaller vehicles that do not have sufficient space to package separate catalyst components.

The ammonia oxidation catalyst zone typically contains precious metals such as platinum, paladium, or a combination thereof, and is applied at about 20 to 25 $g/ft^3$. The coating is generally applied after the SCR coating as an overlayer, and should be applied carefully so that it does not extend into the inlet of the filter. The coating may have some permeation into the filter walls, however.

To prepare the washcoats, each of the respective catalysts are added to an aqueous solution including a binder material and the solution is then applied to the filter. After application of each of the catalyst washcoats, the coated filter is preferably calcined, for example, at about 750° C. for about 16 hours.

Figure 2:
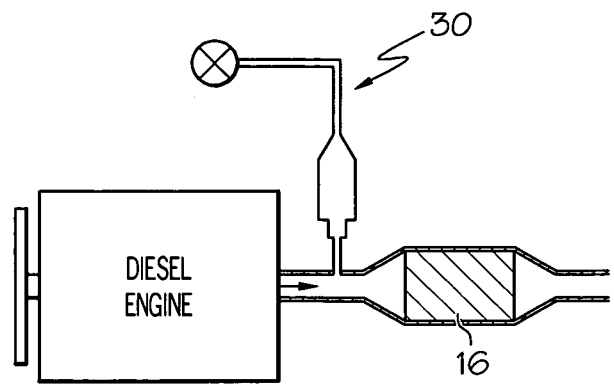
FIG. 2 is a schematic illustration of a diesel engine exhaust treatment system in accordance with another embodiment of the invention.
Figure 2A:
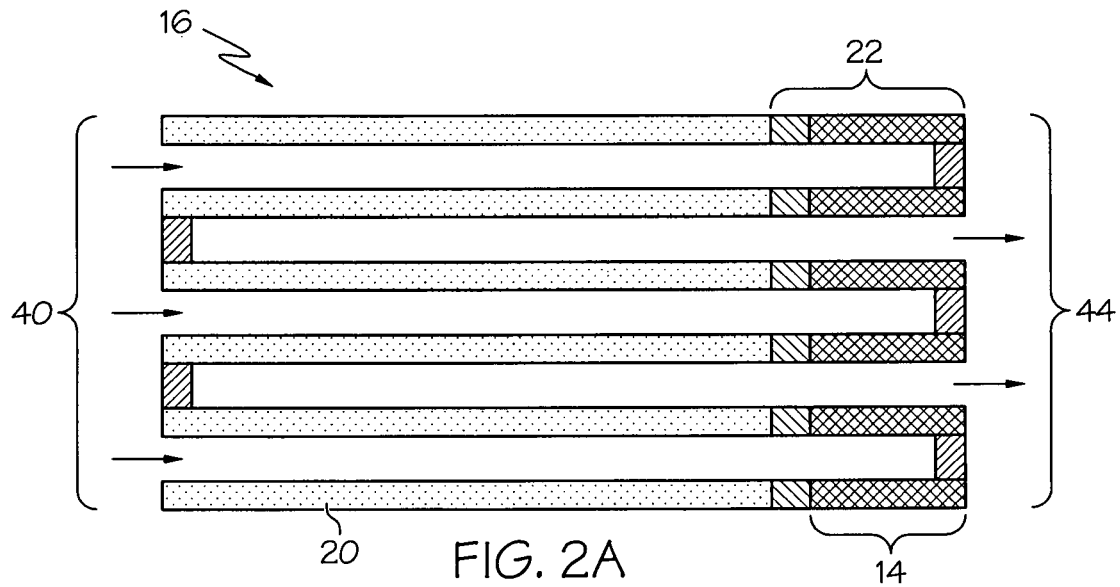
FIG. 2A is a schematic illustration showing an enlarged view of the diesel particulate filter of FIG. 2 including DOC, SCR and ASC catalysts thereon.

Referring now to FIGS. 2 and 2A, an alternative embodiment of the invention is illustrated in which the exhaust treatment system 10 comprises a single brick, and the diesel particulate filter 16 includes a diesel oxidation catalyst 14, an SCR catalyst 20, and an ammonia oxidation catalyst 22. In this embodiment, the treatment system further includes a reductant delivery system 30 as described above.

As shown in FIG. 2A, the SCR catalyst washcoat is applied over the entire filter substrate as described above, such that it permeates the filter walls, followed by application of the ammonia oxidation catalyst washcoat at the outlet channels. The DOC washcoat is then applied over the ammonia oxidation catalyst at the outlet channels. The DOC washcoat overlayer is generally less than or equal to the AMOX washcoat overlayer. As illustrated in FIG. 2A, the AMOX catalyst 22 covers the zone shown at the outlet 44, and the DOC catalyst 14 overcoats the AMOX catalyst 22.

Figure 2B:
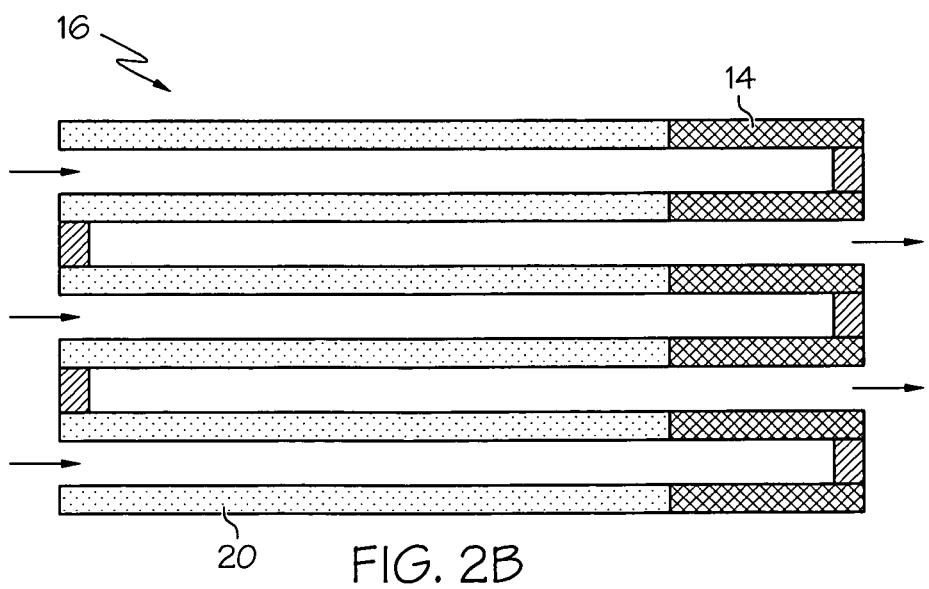
FIG. 2B is a schematic illustration showing an enlarged view of the diesel particulate filter of FIG. 2 including DOC and SCR catalysts thereon.

It should be appreciated that in certain embodiments, separate layers of the ammonia oxidation catalyst and diesel oxidation catalyst may be not required, such that a single pass of a washcoat which provides the function of both catalysts may be applied. This embodiment is illustrated in FIG. 2B, where the exhaust treatment system comprises a diesel particulate filter 16 which includes only a diesel oxidation catalyst 14 and an SCR catalyst 20, which catalysts are capable of performing all of the above functions, i.e., the diesel oxidation catalyst is formulated to perform remove HC and CO as well as remove ammonia slip, and the SCR catalyst is formulated to reduce $NO_x$ as described above.

Figure 3:
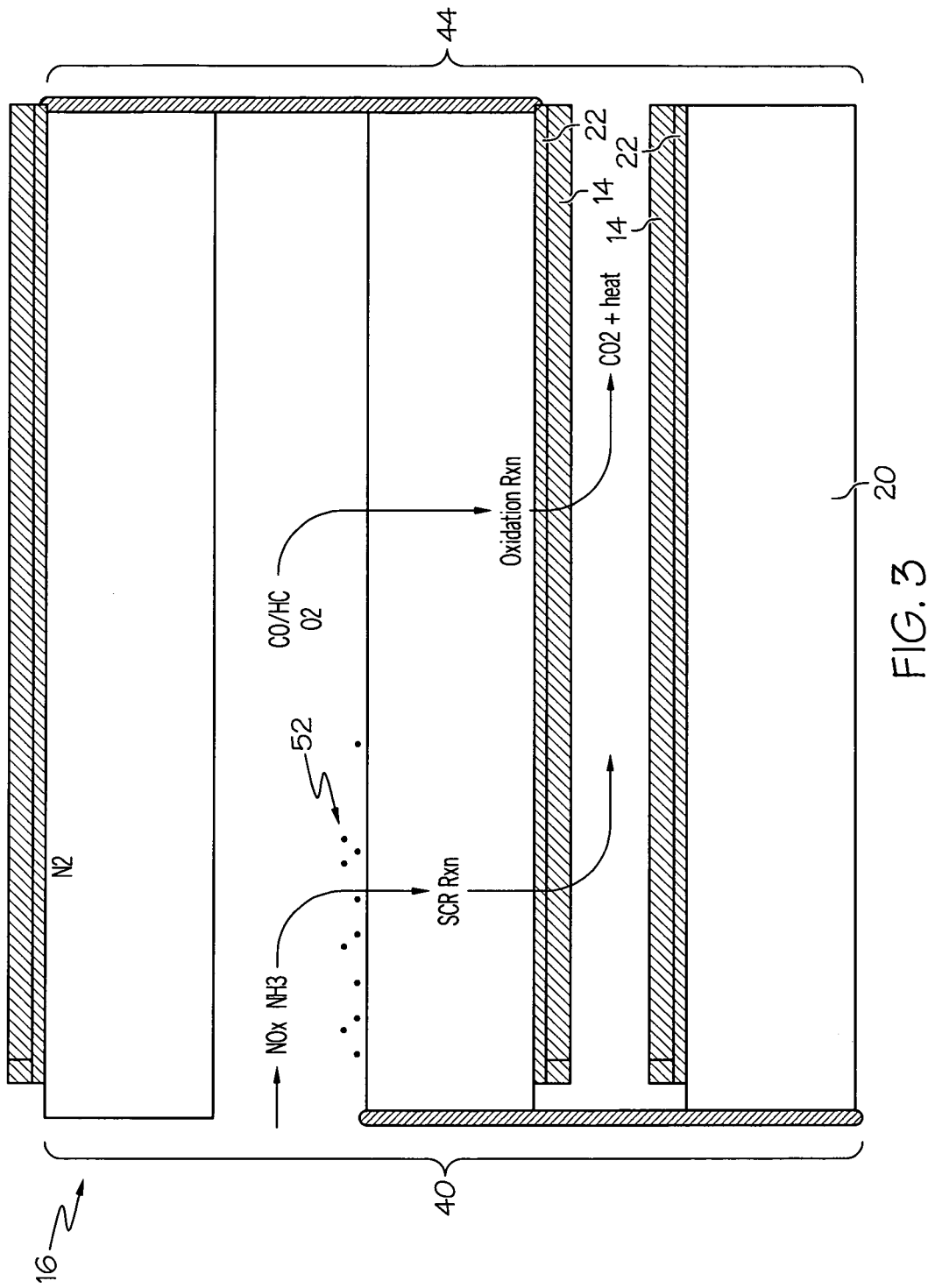
FIG. 3 is a schematic illustration of an embodiment of the diesel particulate filter with exhaust gas passing therethrough.

Referring now to FIGS. 2 and 3, a diesel particulate filter coated with an SCR catalyst 20, a DOC catalyst 14, and an AMOX catalyst 22 is shown in operation. In the embodiment shown, the SCR catalyst 20 is coated within the walls of the filter 16, and the AMOX and DOC catalysts are coated as overlayers which extend from the outlet of the filter. If the length of the filter outlet channel is arbitrarily selected to be 1, then the overlayer for the AMOX catalyst 22, x, has a length from 0<x<1, and the DOC catalyst overlayer 14, y, has a length of 0<y<x. This ensures that the function of the AMOX catalyst is not superseded by the function of the DOC catalyst.

As exhaust gas generated by the diesel engine passes through the exhaust gas manifold into the inlet 40 of the filter 16, the exhaust gas passes through the porous sidewalls of the filter 16 such that the filter collects particulates 52 contained in the exhaust gas. As the exhaust gas exits the filter, the gas flows toward an exhaust gas outlet (not shown).

As the gas passes through the filter, the SCR catalyst 20 removes $NO_x$ from the gas stream by selective catalyst reduction with ammonia supplied from the reductant delivery system 22. Typically, the reductant delivery system 22 utilizes a liquid urea/water solution which is injected upstream of the DPF at metered intervals. The injected liquid urea/water mixture vaporizes and hydrolyzes to form ammonia. Thus, as gas passes through the filter, the $NO_x$ component in the gas is converted with selective catalytic reduction of $NO_x$ with ammonia to form nitrogen.

The ammonia oxidation catalyst (AMOX) 22 functions to reduce ammonia slip which can occur either from the SCR reaction, the release of ammonia from the catalyst surface during rapid temperature increases, or from an excess of reductant. It should be noted that the ammonia oxidation catalyst should be selective toward oxidation of ammonia to nitrogen rather than the formation of NOx or $N_2O$.

The diesel oxidation catalyst 14 functions to remove hydrocarbons (HC) and carbon monoxide (CO) from the exhaust gas.

Thus, the diesel particulate filter 16 including the SCR catalyst and zone coated DOC and AMOX catalysts performs multiple functions: first, it filters particulate matter. The diesel oxidation catalyst functions to remove hydrocarbons (HC) and carbon monoxide (CO) from the exhaust gas; the SCR catalyst is used for the reduction of $NO_x$ with aqueous urea injection, and the ammonia oxidation catalyst is used to remove ammonia slip.

It should be appreciated that the DOC is also used for ignition (light-off) of injected fuel/hydrocarbons during the DPF regeneration process. In this process, the particulate loaded filter is regenerated when back pressure reaches a threshold. During the regeneration process, fuel or other hydrocarbons are injected via post injection or downstream fuel injection upstream of the DOC and ignited to reach a temperature sufficient for the combustion of soot in the filter.

In embodiments where the DOC catalyst is coated on a first brick separately from the DPF as shown in FIG. 1, the system works essentially in the same way as that described above.

In order that the invention may be more readily understood, reference is made to the following examples which are intended to illustrate the invention, but not limit the scope thereof.

Example 1

A ceramic cordierite DPF substrate having 65% porosity and 21 µm pore size was coated with a Cu/zeolite SCR catalyst. The substrate was 1 inch in diameter and 3 inches in length. The integrated SCR/DPF was evaluated for NO-only SCR reaction at various $NH_3/NO_x$ (ANR) ratios. In comparison, a similar SCR/DPF substrate had deposited thereon a washcoat of an ammonia oxidation catalyst, or ammonia slip catalyst (ASC), i.e., platinum (Pt), at the outlet end. The length of Pt deposition was 0.5 inches and the Pt loading was 20 g/ft$^3$. Steady state activity testing was conducted under the following conditions: flowing 350 ppm NO, 5% $CO_2$, 4.5% $H_2O$, and the balance $N_2$. The $NH_3$ concentration was varied: 315 ppm, 350 ppm, 420 ppm and 525 ppm. This resulted in equivalent $NH_3/NO_x$ ratios of 0.9, 1.0, 1.2, and 1.5. The total gas flow was 12.88 l/min., equivalent to a space velocity of 27,000/h after excluding the p lugged substrate volume on each end.

Figure 4:
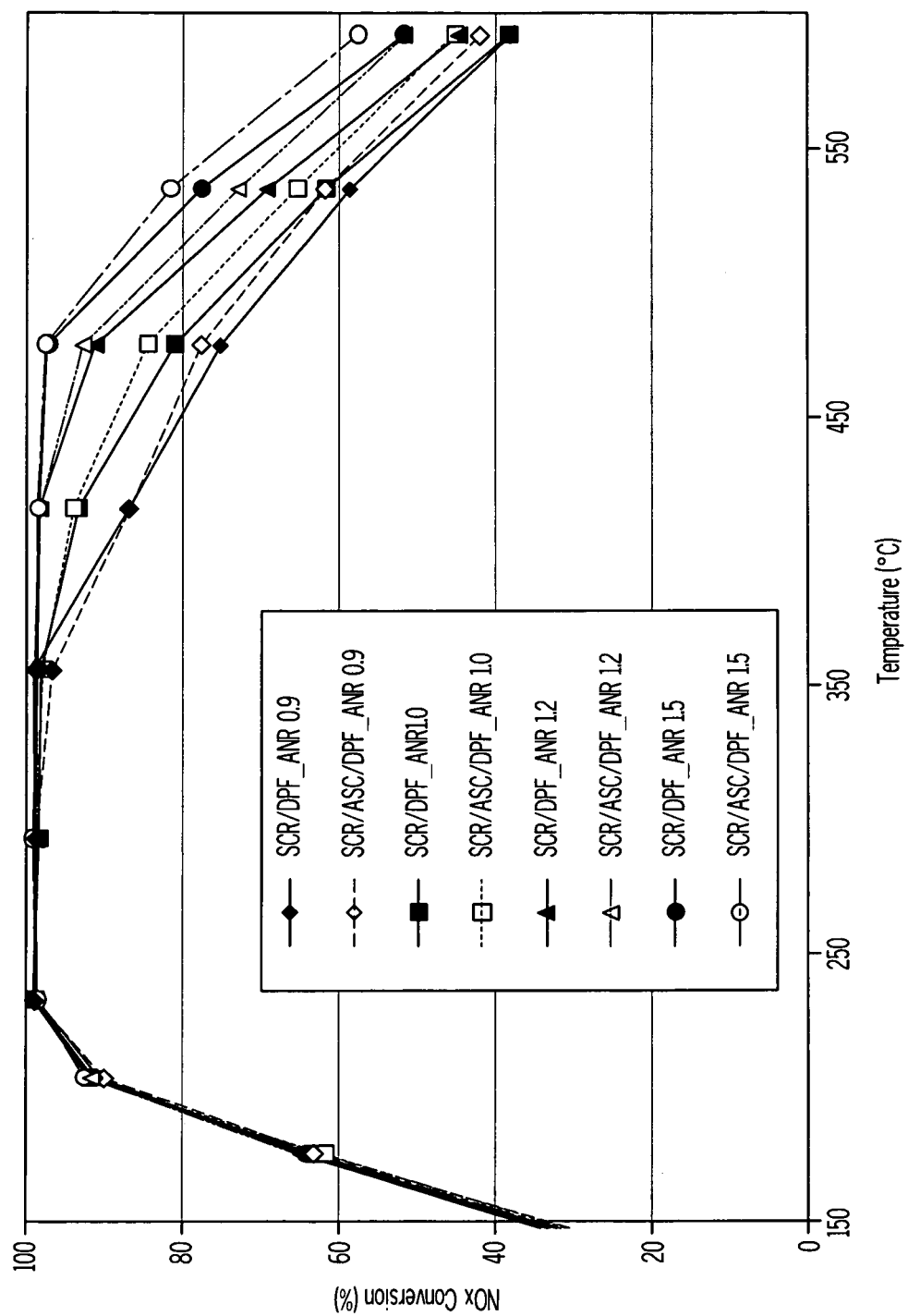
FIG. 4 is a graph illustrating $NO_x$ conversion using a DPF including an SCR catalyst with and without an ammonia oxidation catalyst the outlet of the filter.

FIG. 4 illustrates the $NO_x$ conversions of the integrated SCR/ASC/DPF in comparison with the SCR/DPF at different levels of $NH_3/NO_x$ ratios. The results show that at all levels of ANR, the integrated SCR/ASC/DPF system had almost identical activity for $NO_x$ conversion below 500° C. and even slightly higher activity for $NO_x$ conversion at above 500° C. Pt deposition at the outlet end with short depth had no negative impact on SCR activity.

Figure 5:
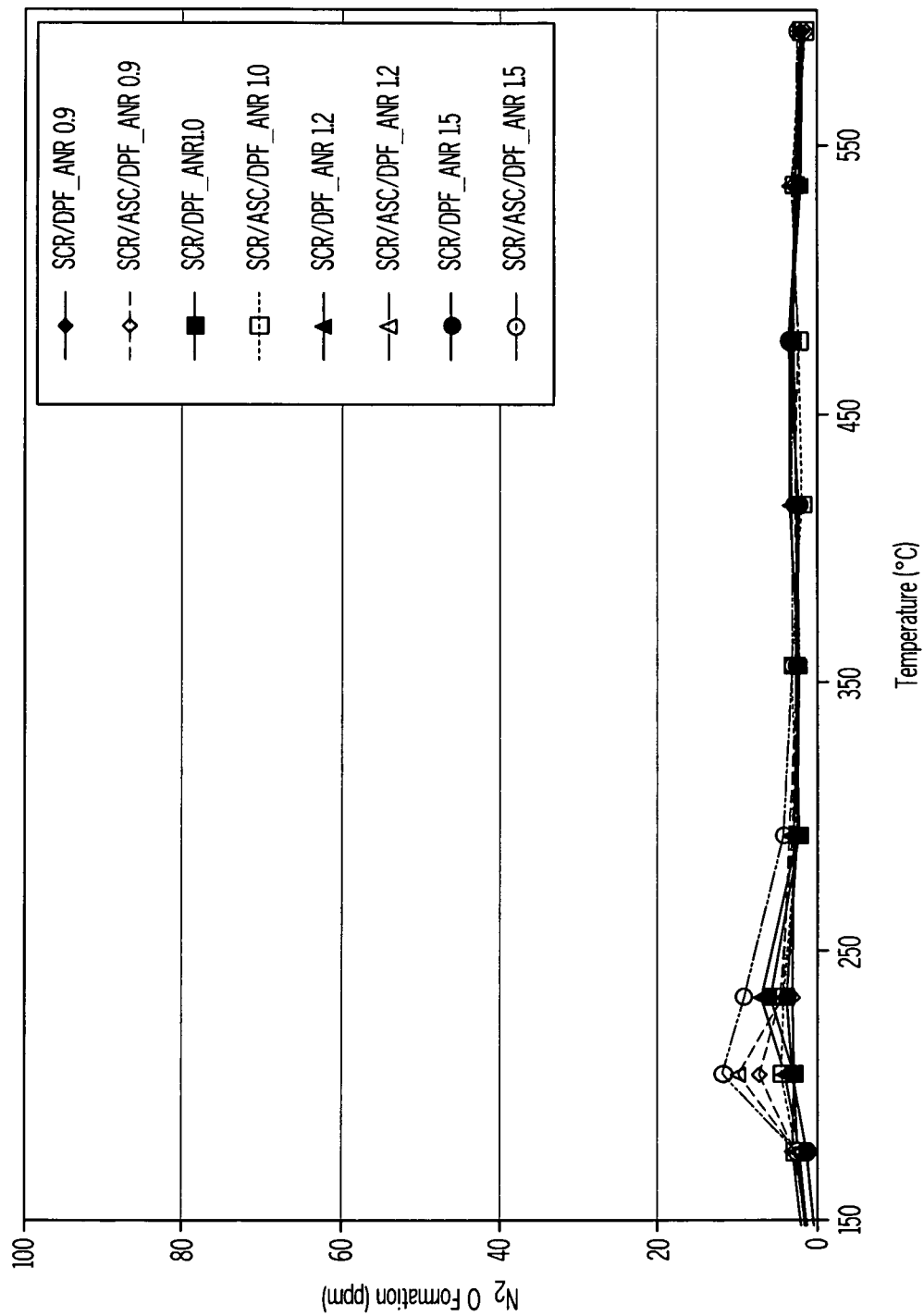
FIG. 5 is a graph illustrating $N_2O$ formation using a DPF including an SCR catalyst with and without an ammonia oxidation catalyst at the outlet of the filter.

FIG. 5 illustrates $N_2O$ formation with the integrated SCR/ASC/DPF system in comparison with the SCR/DPF system. The $NH_3$ conversion with the SCR/ASC/DPF system was always higher than the SCR/DPF system in the temperature range of 200 to 450° C. at all ANR levels. Below 200° C., the impact of Pt was not obvious, i.e., Pt was not active for the reaction below 200° C. Above 400° C., thermal oxidation of $NH_3$ played a role and Pt impact was not obvious, i.e., at higher temperatures, ammonia is combusted without the aid of a catalyst.

Figure 6:
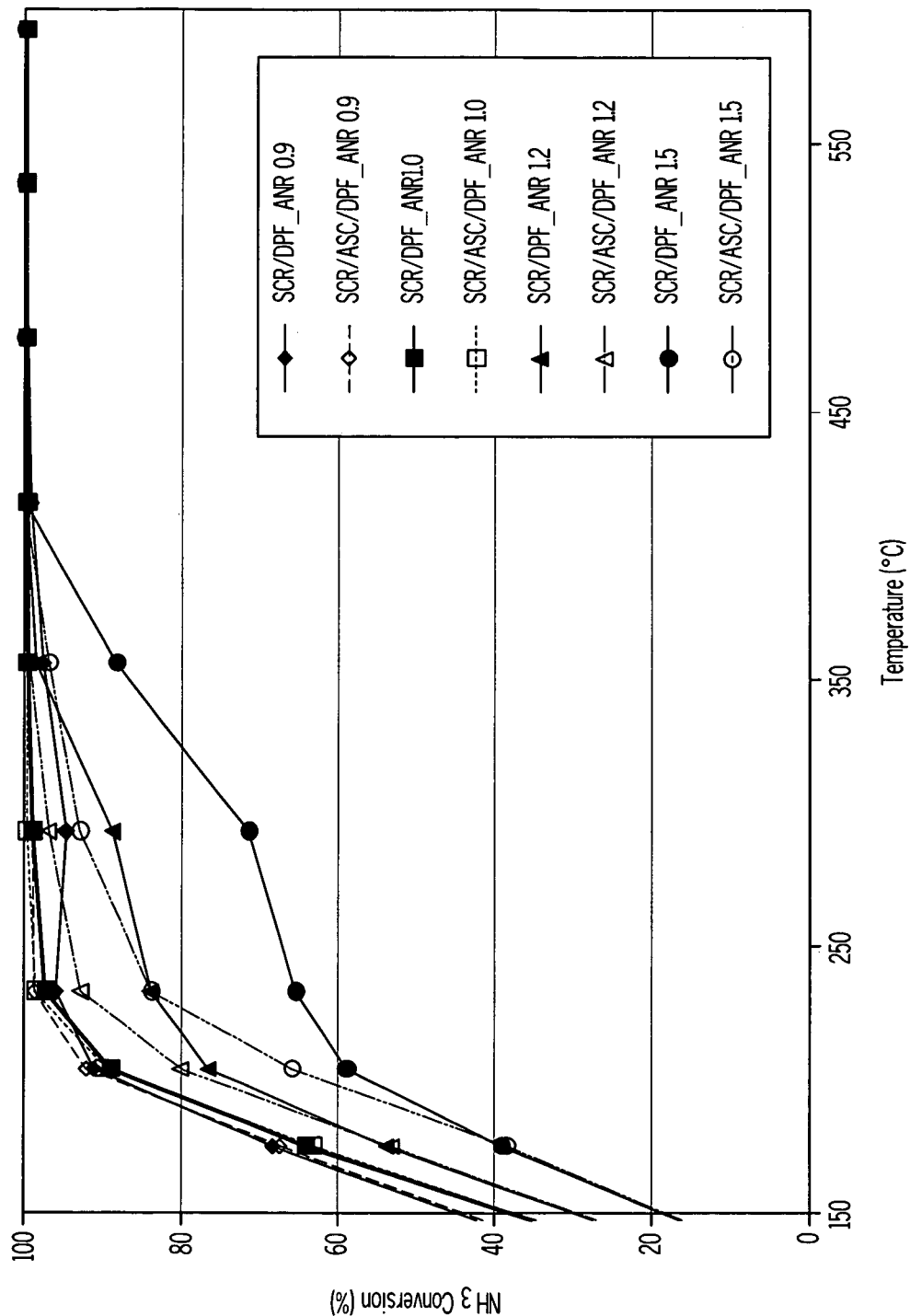
FIG. 6 is a graph illustrating $NH_3$ conversion with a DPF including an SCR catalyst with and without an ammonia oxidation catalyst at the outlet of the filter.
Figure 7:
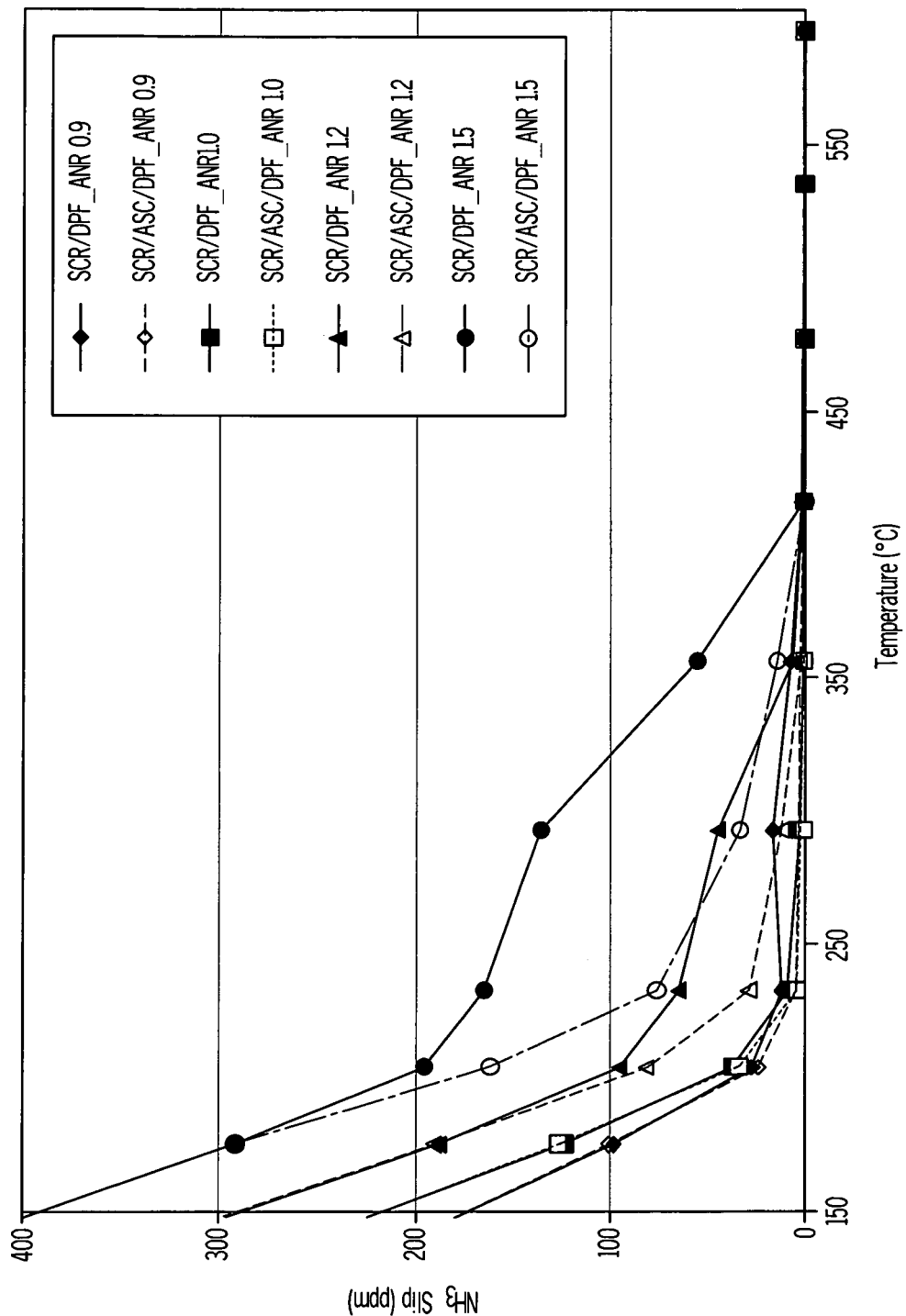
FIG. 7 is a graph illustrating $NH_3$ slip of a DPF including an SCR catalyst with and without an ammonia oxidation catalyst at the outlet of the filter.

The impact of the ammonia oxidation catalyst zone coating on $NH_3$ slip is illustrated in FIGS. 6 and 7. When the ANR was below 1.0, the $NH_3$ slip was different between the SCR/ASC/DPF and the SCR/DPF systems. At higher ANR, $NH_3$ slip from the SCR/ASC/DPF was always lower than that from the SCR/DPF system in the temperature region of 200-450° C.

The results clearly show that the deposition of an ammonia slip catalyst (Pt) at the outlet end of the SCR/DPF system had no negative impact on the $NO_x$ reduction activity and $N_2O$ formation but exhibited enhanced $NH_3$ oxidation activity and reduced $NH_3$ slip for the system.

Example 2

Figure 8:
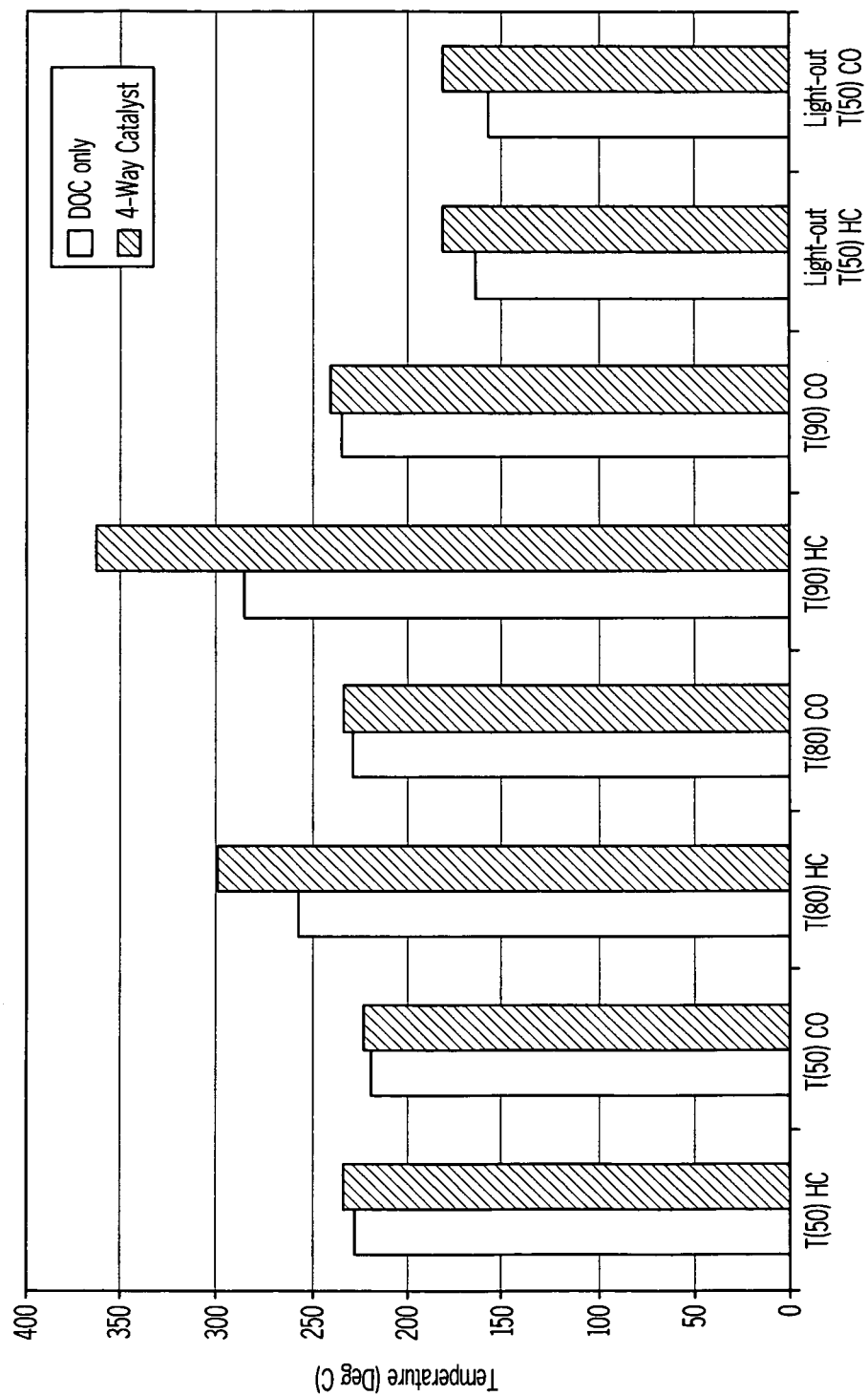
FIG. 8 is a graph illustrating the performance of an exhaust treatment system utilizing a diesel particulate filter including a DOC catalyst, SCR catalyst, and ammonia oxidation catalyst in comparison with an exhaust system utilizing a DOC catalyst only.

FIG. 8 is a graph illustrating the performance of an exhaust treatment system utilizing a diesel particulate filter including a DOC catalyst, SCR catalyst, and ammonia oxidation catalyst in comparison with an exhaust system utilizing a DOC catalyst only. As can be seen, the system utilizing multiple catalysts on the DPF results in similar or better performance in the elimination of HC and CO under varying temperature and light-out conditions.

Figure 9:
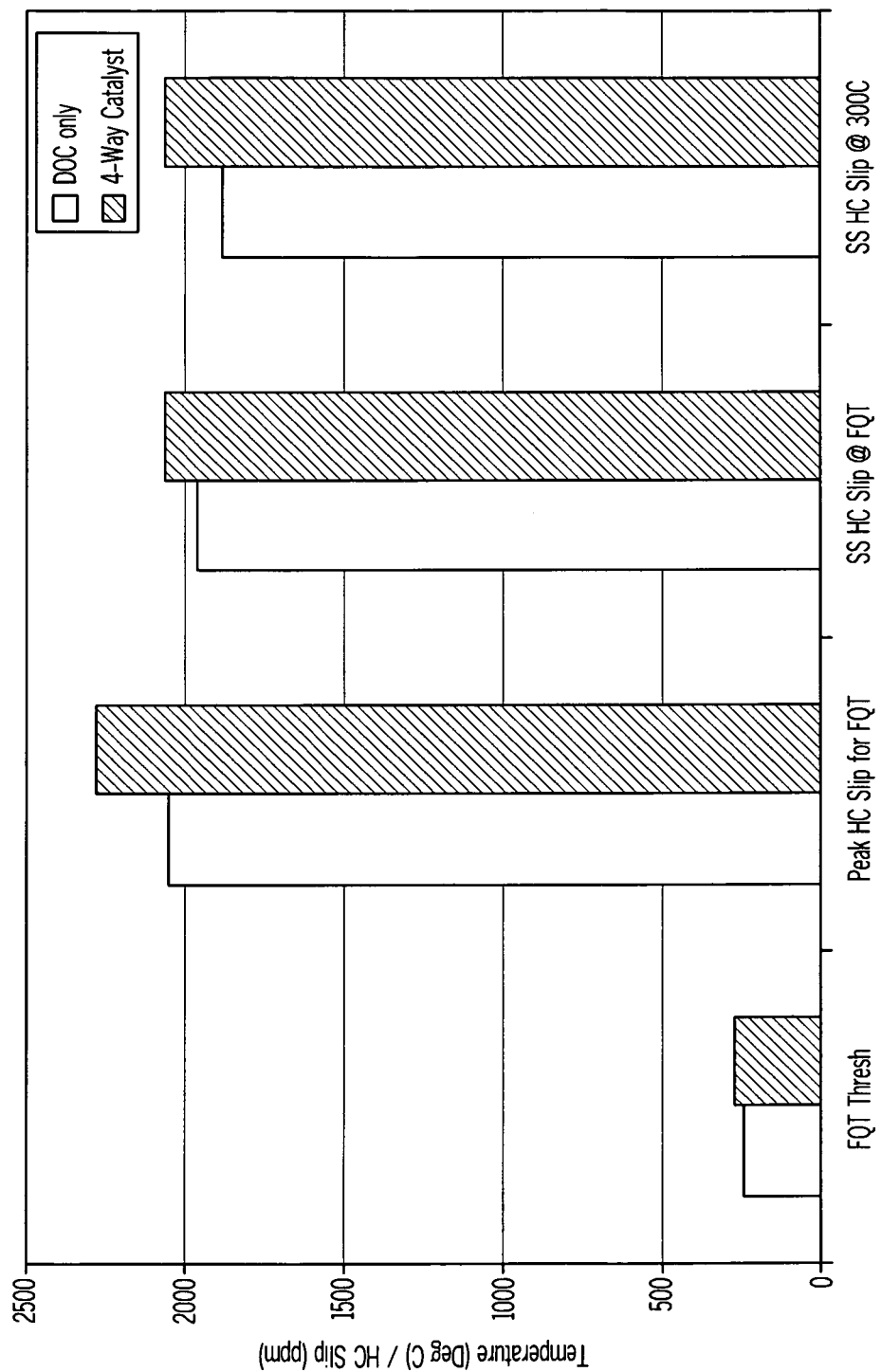
FIG. 9 is a graph illustrating the HC slip performance and fuel quench threshold of the same treatment system of FIG. 8.

The HC slip performance and fuel quench threshold (FQT) of the same treatment systems is shown in FIG. 9. By "FQT", it is meant the minimum safe temperature where the DOC can oxidize post-injection or downstream injection fuel to generate heat for DPF regeneration.

Example 3

Figure 10:
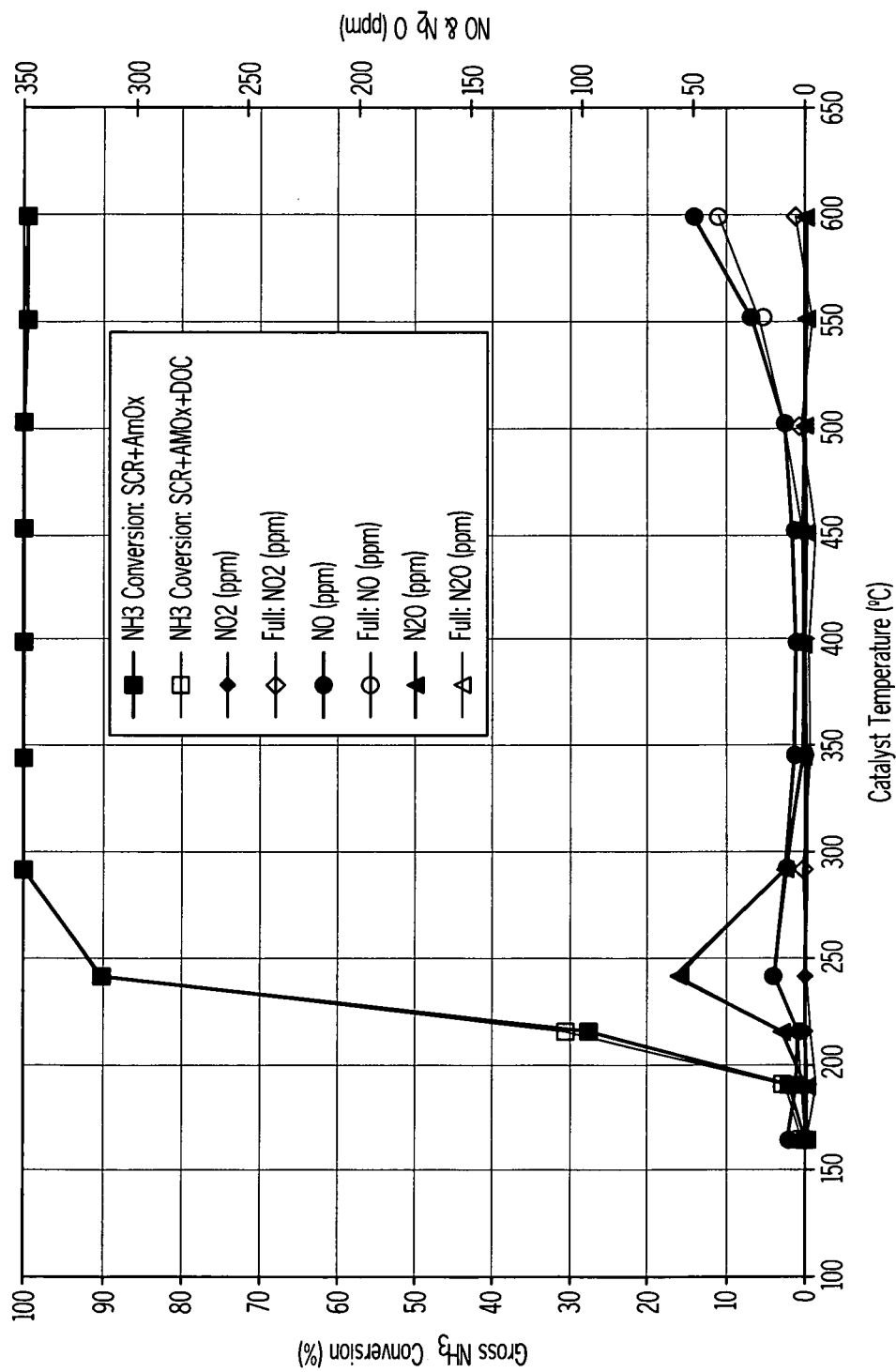
FIGS. 10 and 11 are graphs illustrating the ammonia conversion performance of an exhaust treatment system utilizing a diesel particulate filter including a DOC catalyst, SCR catalyst, and ammonia oxidation catalyst in comparison with an exhaust system utilizing an SCR catalyst and AMOx catalyst only.

FIG. 10 illustrates the ammonia conversion the performance of an exhaust treatment system utilizing a diesel particulate filter including a DOC catalyst, SCR catalyst, and ammonia oxidation catalyst in comparison with an exhaust system utilizing an SCR catalyst and ammonia oxidation catalyst (AmOx) catalyst only. As can be seen, the performance of the two systems both exhibited 100% conversion.

Example 4

Figure 11:
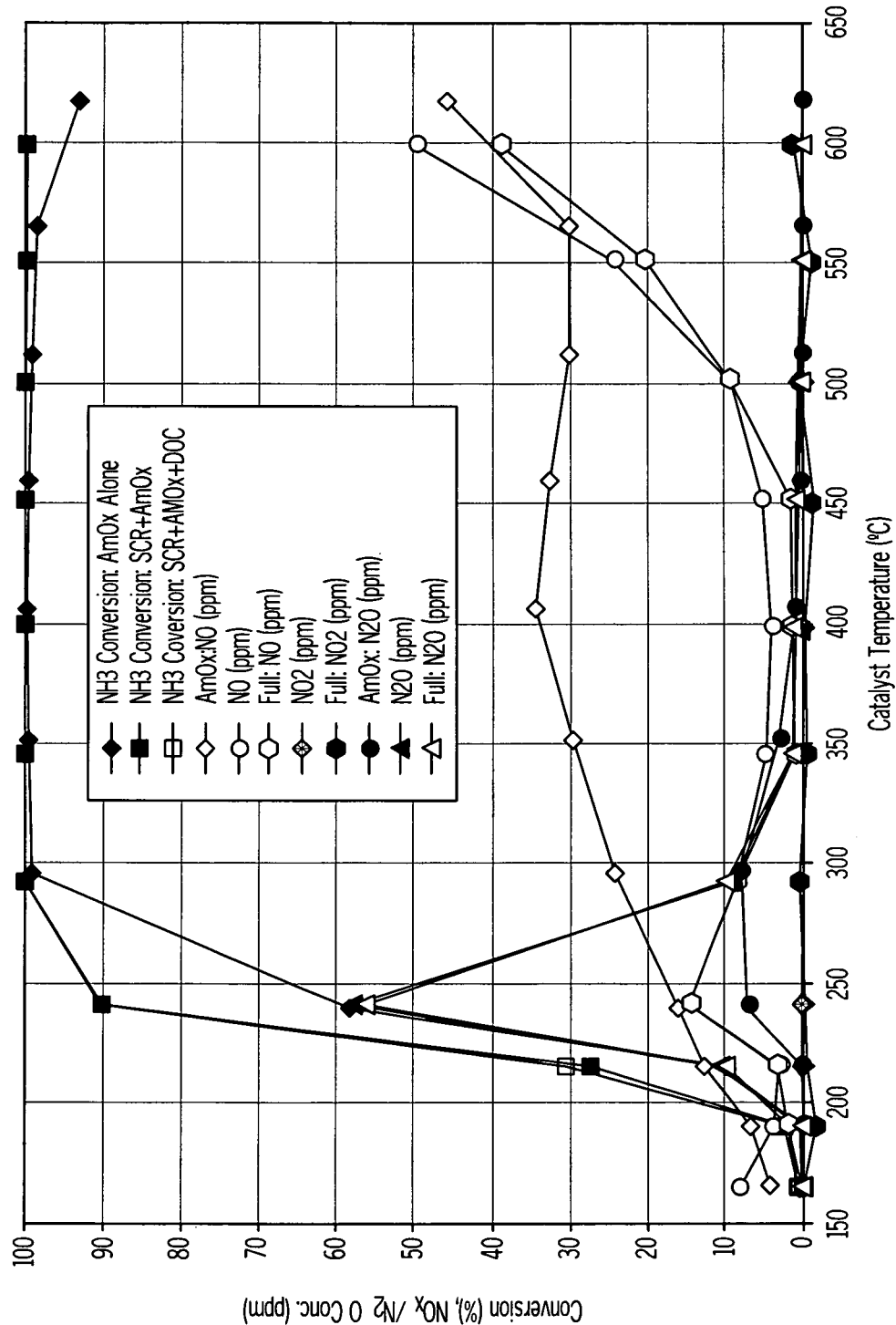

Tests were conducted to determine ammonia conversion performance of a treatment system using only an ammonia oxidation catalyst; an SCR catalyst and an ammonia oxidation catalyst; and an SCR, ammonia oxidation catalyst, and DOC catalyst. As shown in FIG. 11, the ammonia conversion for the DPF including SCR, AmOx and DOC is comparable to the performance of an existing treatment system.

Having described the invention in detail and by reference to preferred embodiments thereof, it will be apparent that modifications and variations are possible without departing from the scope of the invention.

What is claimed is:

1. A diesel exhaust gas treatment system comprising:
a diesel particulate filter positioned in an exhaust stream; said diesel particulate filter including an inlet, an outlet, and a plurality of porous walls; said filter including, in combination, an SCR catalyst, an ammonia oxidation catalyst, and a diesel oxidation catalyst coated thereon, wherein said SCR catalyst is coated completely within the walls of said filter and said diesel oxidation catalyst is coated only at the outlet of said filter; and wherein said diesel oxidation catalyst is applied in an area which is less than or equal to the area containing said ammonia oxidation catalyst; wherein said treatment system comprises one brick.

2. The treatment system of claim 1 wherein said ammonia oxidation catalyst is coated at the outlet of said filter.

3. The treatment system of claim 1 further including a reductant delivery system upstream from said diesel particulate filter; said delivery system adapted to provide a source of ammonia or urea to said exhaust stream.

4. The treatment system of claim 1 wherein said SCR catalyst comprises zeolite and a base metal selected from copper and iron.

5. The treatment system of claim 1 wherein said ammonia oxidation catalyst comprises platinum, palladium, or a combination thereof.

6. The treatment system of claim 1 wherein said diesel oxidation catalyst comprises platinum, palladium, or a combination thereof.

7. The treatment system of claim 1 wherein said diesel particulate filter has a porosity of from about 50 to 65%.

8. The treatment system of claim 1 wherein said diesel particulate filter includes a plurality of channels separated by porous walls; wherein said channels are open at one end and plugged at the opposite end to trap particulates therein.

9. A diesel exhaust gas treatment system comprising:
a diesel particulate filter positioned in an exhaust stream; said diesel particulate filter including an inlet, an outlet, and a plurality of porous walls; said filter including an SCR catalyst, a diesel oxidation catalyst, and an ammonia oxidation catalyst coated thereon; wherein said SCR catalyst is coated completely within the walls of said filter and said diesel oxidation catalyst is coated only at the outlet of said diesel particulate filter; and wherein said diesel oxidation catalyst is applied in an area which is less than or equal to the area containing said ammonia oxidation catalyst; and
a separate diesel oxidation catalyst positioned upstream from said diesel particulate filter.

10. The treatment system of claim 9 comprising first and second bricks, wherein said first brick comprises said separate diesel oxidation catalyst and said second brick comprises said diesel particulate filter including said SCR catalyst, said ammonia oxidation catalyst, and said diesel oxidation catalyst.

11. The treatment system of claim 9 wherein said ammonia oxidation catalyst is coated at the outlet of said filter.

12. A method for treating diesel engine exhaust gases comprising:
providing an exhaust gas treatment system comprising a diesel particulate filter including an inlet, an outlet, and a plurality of porous walls; said filter including, in combination, an SCR catalyst, an ammonia oxidation catalyst, and a diesel oxidation catalyst coated thereon; wherein said SCR catalyst is coated completely within the walls of said filter and said diesel oxidation catalyst is coated only at said outlet; and wherein said diesel oxidation catalyst is applied in an area which is less than or equal to the area containing said ammonia oxidation catalyst;
passing exhaust gases through said exhaust gas treatment system; wherein particulate matter from said exhaust gases is trapped on said filter, a substantial portion of $NO_x$ in said exhaust stream is converted to $N_2$; a substantial portion of CO and HC in said exhaust stream are converted to $CO_2$ and $H_2O$; and a substantial portion of ammonia emissions are converted to $N_2$.

13. The method of claim 12 wherein said diesel particulate filter includes said ammonia oxidation catalyst at the outlet of said filter; and wherein $NO_x$ conversion and particulate matter trapping occur at the inlet of said filter and HC, CO, and ammonia emissions are converted at the outlet of said filter.

14. The method of claim 12 wherein said exhaust gas treatment system further includes a diesel oxidation catalyst positioned upstream from said diesel particulate filter.

15. The method of claim 12 wherein said exhaust gas treatment system further includes a reductant delivery system upstream from said diesel particulate filter, said delivery system adapted to provide a source of ammonia or urea to said exhaust stream.

16. The method of claim 15 wherein said reductant delivery system comprises an injector for injecting a vaporized mixture of reductant and air into the exhaust gas stream.

17. A diesel exhaust gas treatment system comprising:
a diesel particulate filter positioned in an exhaust stream; said diesel particulate filter including an inlet, an outlet, and a plurality of porous walls; said filter including, in combination, an SCR catalyst, an ammonia oxidation catalyst, and a diesel oxidation catalyst coated thereon, wherein said SCR catalyst is coated completely within the walls of said filter, and wherein said diesel oxidation and ammonia oxidation catalysts are coated only at the outlet of said filter; wherein said diesel oxidation catalyst is applied in an area which is less than or equal to the area containing said ammonia oxidation catalyst.

* * * * *